United States Patent
Thom et al.

(10) Patent No.: US 11,759,733 B2
(45) Date of Patent: Sep. 19, 2023

(54) FILTERING APPARATUS COMPRISING AN INTEGRATED FLOW REDUCER, AND METHOD FOR COMPLETELY IMBIBING A FILTER MEMBRANE

(71) Applicant: SARTORIUS STEDIM BIOTECH GMBH, Goettingen (DE)

(72) Inventors: Volkmar Thom, Goettingen (DE); Thomas Loewe, Goettingen (DE); Sebastian Handt, Goettingen (DE); Maik Sommer, Seeburg (DE)

(73) Assignee: SARTORIUS STEDIM BIOTECH GMBH

( * ) Notice: Subject to any disclaimer, the term of this patent is extended or adjusted under 35 U.S.C. 154(b) by 804 days.

(21) Appl. No.: 16/635,835

(22) PCT Filed: Jul. 24, 2018

(86) PCT No.: PCT/EP2018/070037
§ 371 (c)(1),
(2) Date: May 12, 2020

(87) PCT Pub. No.: WO2019/025239
PCT Pub. Date: Feb. 7, 2019

(65) Prior Publication Data
US 2020/0269166 A1    Aug. 27, 2020

(30) Foreign Application Priority Data
Aug. 1, 2017   (DE) ................. 10 2017 117 419.2

(51) Int. Cl.
*B01D 29/66* (2006.01)
*B01D 35/157* (2006.01)
(Continued)

(52) U.S. Cl.
CPC ......... *B01D 29/668* (2013.01); *B01D 35/147* (2013.01); *B01D 35/1573* (2013.01);
(Continued)

(58) Field of Classification Search
CPC ..... F16K 1/18; F16K 1/20; F16K 1/22; F16K 15/028; F16K 2200/40; F16K 2200/401; F16K 2200/402
See application file for complete search history.

(56) References Cited

U.S. PATENT DOCUMENTS 5,108,606 A    4/1992   Maglio
5,227,062 A    7/1993   Olsen
(Continued)

FOREIGN PATENT DOCUMENTS

CN        201684485 U      12/2010
DE     102012103462 A1      1/2013
(Continued)

*Primary Examiner* — Bradley R Spies
(74) *Attorney, Agent, or Firm* — Dilworth IP, LLC (57) ABSTRACT

A filtration device, in particular a disposable filtration device, has a flow path in which a filter element and an integrated flow reducer are arranged one behind the other. The flow reducer is adapted to be brought to a first operating position, which permits a defined first volume flow rate, and at least to a second operating position, which permits a defined second volume flow rate which is smaller than the first volume flow rate.

16 Claims, 8 Drawing Sheets

(51) Int. Cl.
 *B01D 61/20* (2006.01)
 *B01D 35/147* (2006.01)

(52) U.S. Cl.
 CPC .......... *B01D 61/20* (2013.01); *B01D 2313/18* (2013.01); *B01D 2313/19* (2013.01)

(56) References Cited

U.S. PATENT DOCUMENTS

| | | |
|---|---|---|
| 9,400,059 B2 | 7/2016 | Matthiesen |
| 10,350,551 B2 | 7/2019 | Armgart et al. |
| 2007/0262029 A1 | 11/2007 | Yoshida et al. |
| 2009/0120503 A1* | 5/2009 | Donahue ................ F16K 17/14 137/1 |
| 2014/0144822 A1 | 5/2014 | Senninger et al. |
| 2016/0001650 A1* | 1/2016 | Wright ..................... F01P 7/14 138/46 |
| 2018/0128383 A1* | 5/2018 | Sutterfield ............ F16K 27/044 |

FOREIGN PATENT DOCUMENTS

| | | |
|---|---|---|
| DE | 102014012784 A1 | 3/2016 |
| DE | 202017103082 U1 | 6/2017 |
| EP | 1457460 A2 | 9/2005 |
| EP | 1743689 A1 | 1/2007 |
| EP | 1776991 A1 | 4/2007 |
| EP | 2540674 A1 | 1/2013 |
| GB | 191007278 A | 8/1910 |
| WO | 2011095299 A1 | 8/2011 |

* cited by examiner

FILTERING APPARATUS COMPRISING AN INTEGRATED FLOW REDUCER, AND METHOD FOR COMPLETELY IMBIBING A FILTER MEMBRANE

The invention relates to a filtration device, in particular a disposable filtration device, having an integrated flow reducer. The invention further relates to a method of completely wetting a filter membrane in such a filtration device.

BACKGROUND OF THE INVENTION

In the pharmaceutical industry, filtration devices are, as a rule, subjected to an integrity test before use. Alternatively or additionally, such a test may also be carried out after a filtration process. For an integrity test, a filter should be wetted beforehand. To this end, the filter unit is flushed with a reference liquid (e.g., high-purity water). In such a flushing process, a filter is wetted more efficiently—and thus subsequently tested for integrity more reliably—if it is flushed against a back pressure. The back pressure ensures that any trapped gas is dissolved better and/or bubbles are reduced in size and can migrate through the filter membrane. Since the back pressure reduces the transmembrane pressure (e.g., 0.5 bar at a flushing pressure of 2.5 bar, obtained by a back pressure of 2 bar), significantly less water is needed for a reliable wetting.

For setting the back pressure, a controllable valve and a pressure sensor are usually provided downstream of the filter. With the aid of the control valve, the back pressure is adjusted to a desired value (e.g. to 2 bar) at a specific volume flow rate.

Particularly when disposable, or single use, components are used, integration of a control valve and a pressure sensor is complex and requires additional connections. In addition, when using disposable components, saving water is of particular importance, since sterile water must be provided in bags here.

SUMMARY OF THE INVENTION

The object of the invention is to provide a low-cost, effective flushing of a filter unit and a more effective wetting of the filter membrane, which is specifically, but not exclusively, adapted to single-use applications.

This object is achieved by a filtration device having the features of claim 1. Advantageous and expedient configurations of the filtration device according to the invention are indicated in the dependent claims.

The filtration device according to the invention is designed in particular as a disposable filtration device and includes a flow path in which a filter means and a preferably integrated flow reducer are arranged one behind the other. The flow reducer is adapted to be brought to a first operating position, which permits a defined first volume flow rate, and at least to a second operating position, which permits a defined second volume flow rate which is smaller than the first volume flow rate. According to the invention, the ratio between the second volume flow rate (flushing operating position) and the first volume flow rate (filtration operating position) is between 0.05 and 0.9.

The arrangement "one behind the other" of the filter means and of the flow reducer, which is preferably integrated in the filtration device, relates to the flow direction of the medium in the flow path. The flow direction need not necessarily be the flow direction in the filtration operation of the filter means as intended. For example, a hollow fiber capsule having an inlet and an outlet that are configured separately can basically be charged from both sides, i.e. in different directions. The only decisive point is that the flow reducer is arranged downstream of the filter means when the filter means is flushed.

An "integrated" flow reducer within the meaning of the invention is understood to mean a flow reducer which need not be newly connected to the filtration device before it is used, but is already an integral part of the filtration device. A change between the two operating positions of the flow reducer does not require any components to be added or removed. Therefore, the entire filtration device, provided it is designed as a disposable filtration device, inclusive of the flow reducer, can be sterilized. This significantly simplifies the handling of the filtration device. The sterility of the flow reducer will not be affected by changing over between its two operating positions later.

The invention is based on the finding that when a filter means is flushed, a more reliable wetting results if an appropriate back pressure is provided during the flushing operation. The water saving achieved owing to the more effective wetting can amount to up to 95%, so that the quantity of flushing medium, which is provided in bags in a costly manner, can be drastically reduced.

The filtration device according to the invention has the advantage that the flow reducer need not be removed for the filtration operation as intended, but can simply be switched over from the "flushing operating position" to the "filtration operating position". The flow reducer can therefore remain in the filtration device as an integrated component after flushing.

With a view to its preferred use in a disposable filtration device, it is advantageous that the flow reducer consists entirely of materials that are sterilizable, in particular by gamma rays, superheated steam or autoclaving. In this way, the flow reducer can be sterilized together with the other components of the filtration device—or separately as a separate prefabricated structural unit.

To generate a suitable back pressure when flushing the filter means, the ratio between the second volume flow rate (flushing operating position) and the first volume flow rate (filtration operating position) should be between 0.05 and 0.5, preferably between 0.05 and 0.15.

According to a fundamental aspect of most preferred embodiments of the filtration device according to the invention, an adjustable control element is provided, which in the first operating position of the flow reducer assumes a defined first position, in which it exposes a first effective flow cross-section. In the second operating position of the flow reducer, on the other hand, the control element assumes a defined second position, in which it exposes a second effective flow cross-section, which is (significantly) smaller than the first effective flow cross-section. Providing such an adjustable control element allows a simple and quick change between the two operating positions of the flow reducer without any special measures having to be taken for this, such as, e.g., an alteration of the filtration device or the like.

For a comfortable switchover between the operating positions of the flow reducer and/or the embedding of the switchover in an automated operation of the filtration device based on a control algorithm, a control device may optionally be provided by means of which the control element can be moved to the first position and to the second position in an automated manner.

With a view to an extended range of application of the flow reducer, it may be provided that the control element can assume further defined positions in addition to the first and second position, in particular intermediate positions. The pressure can then be adjusted over a selectable range, rather than only between two values.

According to a preferred concept for putting the idea of the invention to practice technically, the control element is adapted to be moved to the defined positions by means of a sliding mechanism or a rotating mechanism. Sliding or rotary movements can be carried out easily and quickly both manually and in an automated manner. This means that no complex processes are required for the switchover of the flow reducer between its operating positions.

In order that the different positions of the control element and the associated different volume flow rates can be obtained in a reproducible manner, the defined positions of the control element are preferably configured as detent positions. Detent positions are resistant to light touch, vibrations and many other influences which might cause an unintentional shifting of the control element. In addition, detent positions have the advantage that a user can clearly see from the haptic feedback that the control element has assumed a certain position.

The control element can be transferred to the individual detent positions by means of a pretensioned actuating element, for example.

To protect the sliding or rotating mechanism and, if necessary, the actuating element, it is advantageous to have a protective covering which surrounds the corresponding components. Preferably, the protective covering is formed from a deformable and sterilizable elastomer. The protective covering constitutes a flexible sterile barrier, which nonetheless permits an external actuation of the sliding or rotating mechanism.

According to a preferred embodiment of the invention, the control element comprises an orifice plate having a passage opening, which can be inserted into a pipe section of the flow reducer. Similar to a slide projector, the orifice plate is introduced into the flow path to reduce the effective flow path to a specific extent. The volume flow rate can be adjusted as desired by appropriately designing the orifice plate (size and shape).

In a different embodiment, the control element comprises a body movable in a pipe section of the flow reducer and having a passage that is oriented in the flow direction in the first position of the control element and substantially transversely to the flow direction in the second position of the control element. This means that in the first position of the control element, the passage allows a substantially unhindered flow through the pipe section, whereas in the second position the passage is rotated out of the flow path so that the body of the control element blocks a large part of the medium passage.

In order to ensure a certain small volume flow rate past the control element in the second position of the control element, which corresponds to the flushing operation, the body and the passage of the control element may, without any particular effort, be designed such that sickle-shaped passage ducts are provided.

According to a further embodiment, the control element may also be in the form of a disk which is rotatable in a pipe section of the flow reducer. The outside diameter of the disk is smaller than the inside diameter of the pipe section by a defined dimension, and/or the outer contour of the disk has one or more recesses extending from the outside inwards. By rotating the disk from a first position, in which only its narrow side faces the flow, to a second position, in which the disk covers the major part of the flow cross-section of the pipe section, the desired reduction in the volume flow rate can be achieved in a simple manner.

The adjustment of different volume flow rates may also be attained by a control element having orifice plate sections which cooperate with orifice plate sections at an outlet opening of the flow reducer. Such an embodiment requires comparatively few components.

In the first position of the control element, the respective orifice plate sections are superposed to the greatest possible extent so that free intermediate spaces are left for a large volume flow rate. In the second position of the control element, the orifice plate sections cover the free intermediate spaces to the greatest possible extent, with a defined free flow passage being left for a significantly smaller volume flow rate.

According to a different concept for technically putting the idea of the invention to practice, the flow reducer includes a pipe section that is divided into two partial sections and has mouths that are opposite each other. The control element comprises an axially displaceable cone which in the first position of the control element dips less far into the mouth of one of the partial sections than in the second position of the control element. The volume flow rate depends on the position of the cone, since the greater the depth of immersion, the more of the available flow cross-section is blocked by the cone. The control element does not, of course, need to have a perfect cone shape. As is apparent to a person skilled in the art, the control element needs to have a cross-section that generally increases in the direction of displacement. The term "cone" should be construed accordingly.

The cone may be attached to an axially positionable sleeve which connects the two partial sections with each other. The sleeve thus serves both to position the cone and to seal the partial sections of the pipe section.

The axial positioning of the sleeve with the cone can be realized by means of a finely adjustable threaded joint. To this end, the sleeve has an internal thread which engages with an external thread on one of the partial sections of the pipe section, the sleeve preferably being firmly connected to the other partial section and this partial section therefore following the rotation of the sleeve.

In both positions it must be ensured that a greater or lesser amount of medium can flow past the cone. In this connection, a preferred design provides that the cone is held to the sleeve by struts, with free intermediate spaces being left between the struts.

The pipe section in the flow reducer the flow cross-section of which is to be variable may also be in the form of a flexible hose. The control element, when in its second position, then reduces the effective flow cross-section of the hose by a specific degree for the flushing operation, which can be achieved in different ways.

According to a first variant, the control element is a hose clamp having two clamp sections which are adapted to be deflected relative to each other and which engage the outer wall of the hose. Such a hose clamp can be used to selectively reduce the effective flow cross-section of the hose at the point of the clamping.

For a relative deflection of the clamp sections, they are preferably connected to each other by means of a joint.

According to a second variant, the control element is in the form of a bendable articulated rail having two substantially rigid collar sections and an articulated joint located therebetween. The two collar sections of the articulated rail each surround a partial section of the pipe section. Similar to a knee orthosis, an angle can be set which specifies an angled end position of the two collar sections. With the aid of the articulated rail, a defined bend with a reduced flow cross-section can thus be created in the hose.

Both variants feature the advantage that no additional seals are required.

Yet another concept provides that the control element comprises movable flaps which are arranged in a pipe section of the flow reducer and are adapted to be deflected by means of a force field generated outside the pipe section. This embodiment is advantageous since no additional seals etc. are required. The movable parts of the control element are located inside the pipe section and can be driven in a contactless manner.

The force field required for this may be provided by a force field generator arranged outside the pipe section.

According to a preferred design of this embodiment, the flaps are fitted to a wall of the pipe section by means of joints.

For a defined end position of the flaps, it may be provided that the deflection of the flaps is limited by flap stops.

In a further embodiment of the invention, a pipe section of the flow reducer comprises a main pipe section having a first valve as the control element and a bypass pipe section for bypassing the first valve. The flow cross-section of the bypass pipe section is (markedly) smaller than the flow cross-section of the main pipe section. Such a construction of the flow reducer allows the main pipe section to be shut off for the flushing operation so that the flushing medium can only flow through the bypass pipe section. Since the latter has a significantly smaller flow cross-section, the volume flow rate is correspondingly lower.

For this fundamental functionality, the first valve should be adapted to fully open and fully close the main pipe section.

Optionally, a second valve may be provided in the bypass pipe section in order to adjust the flow cross-section and thus the volume flow rate during the flushing operation to the given requirements, if appropriate, or to close the bypass pipe section to have a flow only through the main pipe section.

According to a further development of this embodiment, the first valve and/or the second valve is/are constructed such that they can assume a plurality of positions, in which different flow cross-sections are exposed. This provides a larger number of adjustment options to extend the range of applications; it would also be possible to close the second valve completely.

A method of completely wetting a filter membrane in a filtration device according to the invention within the scope of a flushing process is characterized in that the flow reducer is in the flushing position, i.e. in the second operating position, which permits a defined second volume flow rate, which is smaller than the first volume flow rate. In this way, the flushing of the filter device is effected with a reduced volume, so that the filter is completely wetted more reliably. After the flushing process, the flow reducer is brought to the first operating position for carrying out a filtration process.

This method for complete wetting of a filter membrane is performed while saving flushing medium, in particular water for injection (WFI), by 10 to 95%, preferably by 50 to 95%, more preferably by 85 to 95% in comparison with the complete wetting without pressure reduction.

BRIEF DESCRIPTION OF THE DRAWINGS

Further features and advantages of the invention will be apparent from the description below and from the accompanying drawings, to which reference is made and in which.

DETAILED DESCRIPTION OF THE INVENTION

All of the embodiments described below of a flow reducer 10 for a filtration device have in common that they can replace a previously commonly used separate control valve of a filter means of the filtration device for setting a defined back pressure during flushing of the filter means.

The flow reducer 10 is arranged in the same flow path as the filter means and downstream thereof and is firmly integrated in the filtration device. In particular with a view to the preferred use of the flow reducer 10 in a disposable filtration device, the flow reducer 10 is made entirely from sterilizable materials. This means that the entire disposable filtration device, inclusive of the flow reducer 10, can be sterilized before or after packaging the filtration device, if necessary together with the packaging material, for example by gamma rays, superheated steam or autoclaving.

The flow reducer 10 can change between a first operating position, which exposes or opens a defined first effective flow cross-section, and a second operating position, which exposes or opens a defined second effective flow cross-section, which is markedly smaller than the first effective flow cross-section. To flush the filter means, the flow reducer 10 is brought to the second operating position with a reduced flow cross-section, so that the volume flow through the flow reducer 10 is reduced. Thus, the pressure with which the flushing medium is pressed through the filter means is opposed by a defined back pressure. For example, a flushing pressure of 2.5 bar may be specified, and the flow reducer 10, in its second operating position, opposes this pressure with a back pressure of 2 bar, so that the filter means is ultimately wetted with the flushing medium at a resulting pressure of 0.5 bar.

The back pressure is obtained by the selective reduction of the volume flow rate. The ratio between the volume flow rate during flushing operation and the volume flow rate during filtration operation as intended is between 0.05 and 0.9, preferably between 0.05 and 0.5, more preferably between 0.05 and 0.15.

In most cases, filter means include a dedicated inlet and a dedicated outlet, between which at least one filter membrane is arranged. Here, the terms "inlet" and "outlet" refer to the filtration operation as intended. For the flushing operation, however, a possible reverse feed is to be included here in principle as well, i.e. an intake of the flushing medium through the outlet and an outflow through the inlet.

Changing between the two operating positions of the flow reducer 10 does not require any components to be added or removed, and no connections or disconnections need to be made. The sterility of the flow reducer 10 is not impaired by the changeover.

Figure 1A:
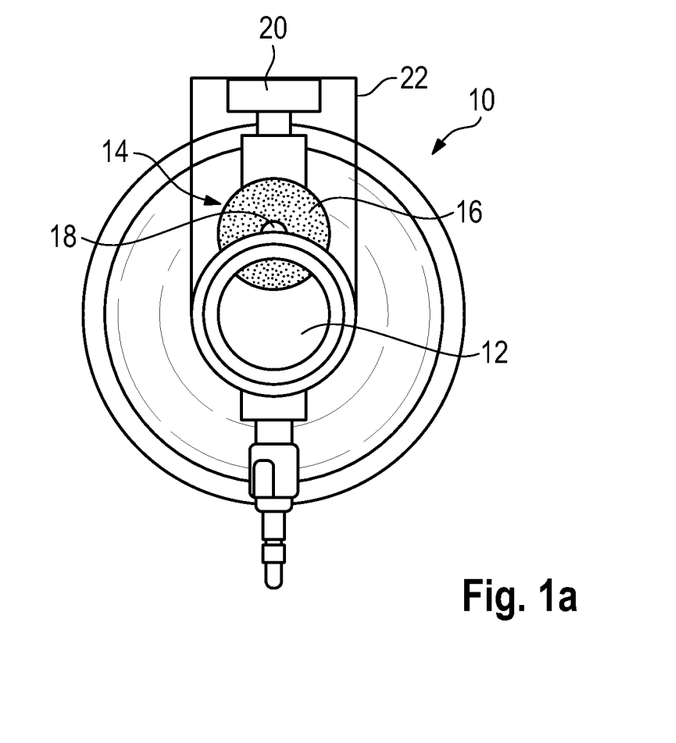
FIG. 1a schematically shows a first embodiment of a flow reducer for a filtration device according to the invention in a first operating position, viewed in the flow direction.
Figure 1B:
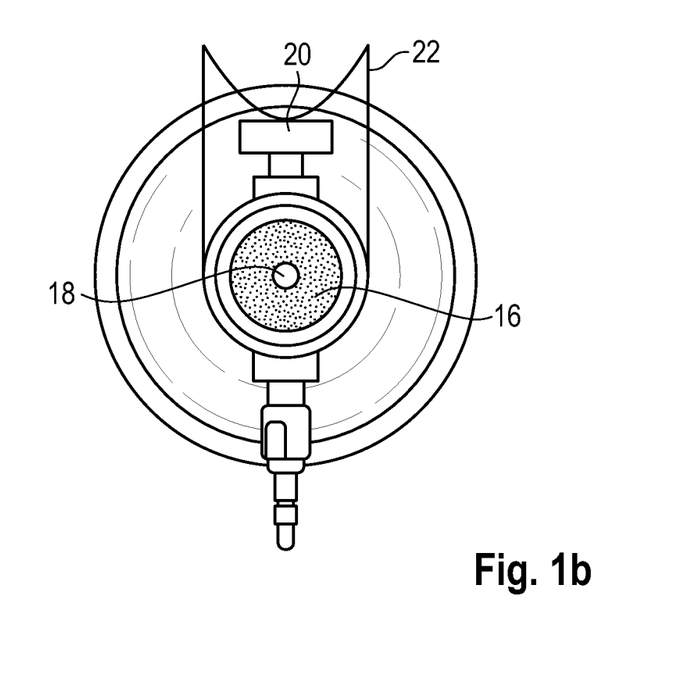
FIG. 1b schematically shows the flow reducer from FIG. 1a in a second operating position.

FIGS. 1a and 1b illustrate a first embodiment of such a flow reducer 10 for a filtration device including at least one filter means. The flow reducer 10 is arranged downstream of the filter means and comprises a pipe section 12 having a defined flow cross-section, which is usually dictated by the inside diameter. The medium which was previously pressed through the filter means flows through the pipe section 12.

The flow reducer 10 further comprises a control element 14, here in the form of an orifice plate 16 having a passage opening 18. The control element 14 can be moved between a defined first position shown in FIG. 1a and a defined second position shown in FIG. 1b.

In the first position, the medium flowing through the pipe section 12 can pass unobstructed to the greatest possible extent. The control element 14 protrudes at most slightly into the pipe section 12 and reduces the flow cross-section of the pipe section 12 only insignificantly or not at all at this point.

In the second position, the control element 14 has been completely inserted into the pipe section 12 and extends substantially across the entire flow cross-section—with the exception of the small passage opening 18 having a defined cross-section.

Basically, further positions of the control element 14 may be provided, in particular intermediate positions with an effective flow cross-section that is reduced in relation to the first position, but increased in relation to the second position.

The defined positions of the control element 14 are detent positions, which are provided by a detent/sliding mechanism. The detent/sliding mechanism includes an actuating element 20, in this case a type of pushbutton, which is coupled to the control element 14 and is pretensioned by means of a spring element. By manually actuating the pushbutton, the control element 14 can be transferred from the first detent position (FIG. 1a) to the second detent position (FIG. 1b). By another actuation, the control element 14 will optionally return to the first detent position, etc.

In principle—just as with all of the embodiments described below—an automated actuation of the control element 14 or the actuating element 20 in connection with a control device is also possible.

A protective covering 22, for example made from a deformable and sterilizable elastomer, surrounds the detent/sliding mechanism inclusive of the actuating element 20. The protective covering 22 serves as an external sterile barrier and protects the inside of the flow reducer 10 from possible contamination.

In the first operating position of the flow reducer 10, in which the control element 14 assumes its first position, the filter means can be used as intended for filtration at a specified medium pressure, i.e. without substantial back pressure.

In the second operating position of the flow reducer 10, in which the control element 14 assumes its second position, the control element 14 blocks the major part of the flow cross-section in the pipe section 12. The medium can now only flow through the small passage opening 18 in the orifice plate 16. Due to the now significantly reduced effective flow cross-section and the reduced volume flow rate caused by this, a defined back pressure is built up in the pipe section 12. In this second operating position of the flow reducer 10 the flushing process takes place.

Preferably, the flow reducer 10 is delivered in the second operating position (flushing position), to be then transferred to the first operating position (filtration position) in one single step after flushing.

When describing the following embodiments of the flow reducer 10, the general principles described above are applicable in the same way. Therefore, only the design differences will be discussed.

For instance, in the second embodiment shown in FIGS. 2a to 2d, the control element 14 is designed differently and the sliding mechanism is replaced by a rotating mechanism which is basically similar to that of a stop valve.

Figure 2A:
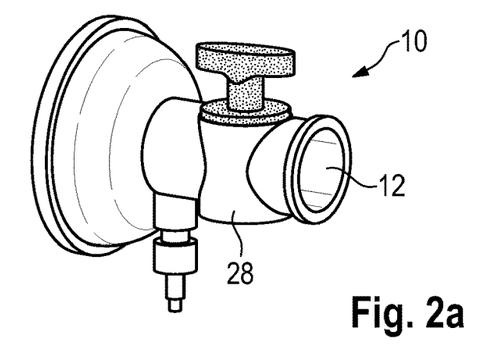
FIG. 2a schematically shows a second embodiment of a flow reducer for a filtration device according to the invention in a second operating position in a perspective view.
Figure 2B:
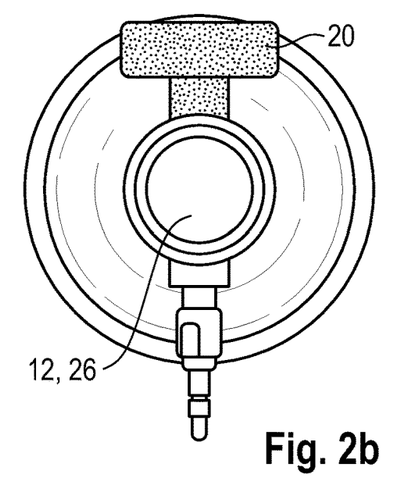
FIG. 2b schematically shows the flow reducer from FIG. 2a in a first operating position, viewed in the flow direction.
Figure 2C:
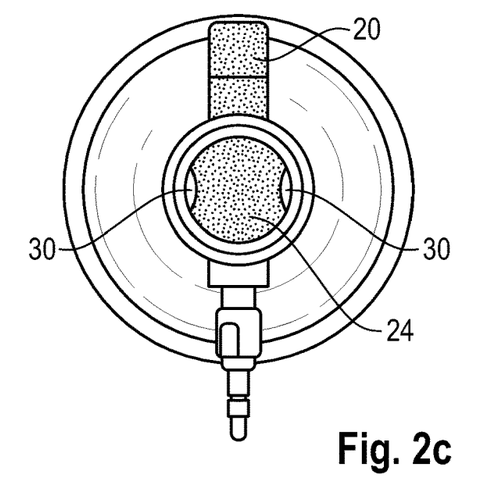
FIG. 2c schematically shows the flow reducer from FIG. 2a in the second operating position, viewed in the flow direction.
Figure 2D:
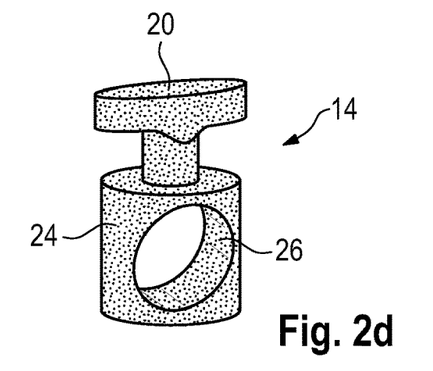
FIG. 2d schematically shows the control element of the flow reducer from FIG. 2a in a perspective view.

The control element 14 shown separately in FIG. 2d has a substantially cylindrical contour here. The otherwise solid body 24 of the control element 14 has a passage 26 which is also substantially cylindrical and the axis of which is perpendicular to the axis of the cylindrical body 24. The body 24 and/or the passage 26 may basically also be shaped differently, e.g. conically.

The control element 14 is received in a matching socket 28 in the pipe section 12 of the flow reducer 10; the control element 14 can rotate in this socket about the axis of the body 24. To rotate the control element 14, an actuating element 20 is provided again, in this case a kind of T-handle, which is connected with the body 24 of the control element 14.

The socket 28 in the pipe section 12 and the body 24 and the passage 26 of the control element 14 are matched to one another such that in a first position of the control element 14, which is shown in FIG. 2b, the axis of the passage 26 is parallel to the axis of the pipe section 12 (flow direction). In this position, the medium can flow through the passage 26 of the control element 14 without hindrance, since the diameter of the passage 26 transverse to the flow direction substantially corresponds to the diameter of the pipe section 12, so that the flow path in the pipe section 12 is completely open.

In the second position, shown in FIGS. 2a and 2c, the control element 14 is rotated through 90°. In this position the body 24 of the control element 14 blocks the flow path for the most part. Only the two remaining passage ducts 30, which are sickle-shaped when viewed in the direction of flow, allow a significantly reduced defined volume flow rate through the pipe section 12.

As in the embodiment described above, further positions of the control element 14, in particular intermediate positions, may basically also be provided, and the defined positions of the control element 14 may be configured as detent positions. This also applies to all further embodiments.

The third embodiment of the flow reducer 10 as shown in FIGS. 3a to 3d is very similar to the second embodiment. Here the body 24 of the control element 14 is in the form of a disk having a defined thickness. The outside diameter of the body 24 is smaller than the inside diameter of the pipe section 12 by a defined dimension, and/or the outer contour of the body 24 is adapted such that one or more recesses extend from the outside inwards.

Figure 3A:
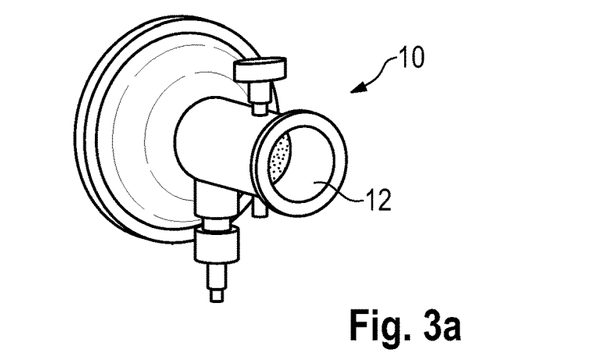
FIG. 3a schematically shows a third embodiment of a flow reducer for a filtration device according to the invention in a second operating position in a perspective view.
Figure 3B:
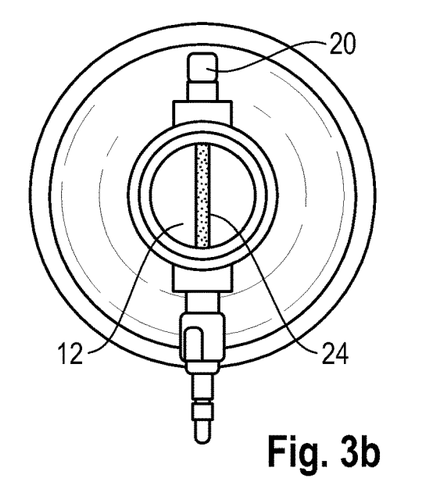
FIG. 3b schematically shows the flow reducer from FIG. 3a in a first operating position, viewed in the flow direction.

For enabling the maximum possible flow, the control element 14 is rotated, with the aid of the actuating element 20 (T-handle), to the first position shown in FIG. 3b, in which the cylinder axis of the body 24 is transverse to the direction of flow, so that the control element 14 only slightly affects the flow through the pipe section 12.

Figure 3C:
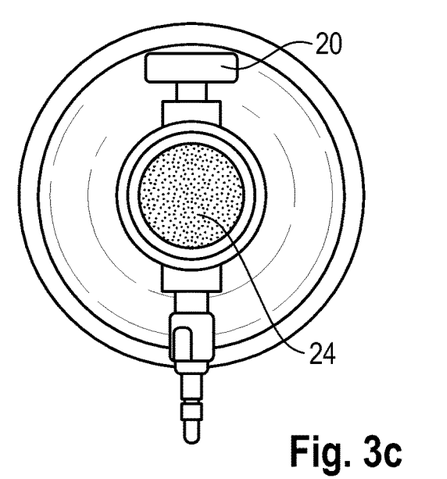
FIG. 3c schematically shows the flow reducer from FIG. 3a in the second operating position, viewed in the flow direction.
Figure 3D:
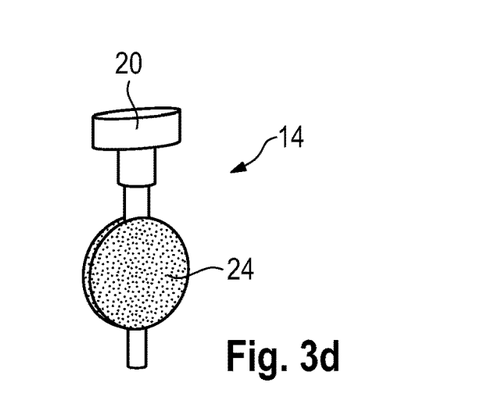
FIG. 3d schematically shows the control element of the flow reducer from FIG. 3a in a perspective view.

For the flushing operation, the control element 14 is rotated to the position shown in FIG. 3c, in which the cylinder axis of the body 24 is oriented parallel to the direction of flow. A defined flow rate is obtained by the outside diameter which is smaller in comparison with the inside of the pipe section 12 or by the recess(es), whereby a free annular channel or one or more differently shaped channels are produced around the body 24, through which the medium can flow.

In the fourth embodiment shown in FIGS. 4a to 4d, provision is also made for a rotatable control element 14. Here, the control element 14 has a substantially hollow cylindrical design, but includes orifice plate sections 32 projecting inwards.

A cover 34 of the flow reducer 10 is matched to the control element 14 and has an outlet opening which is likewise partly covered by orifice plate sections 36.

Figure 4A:
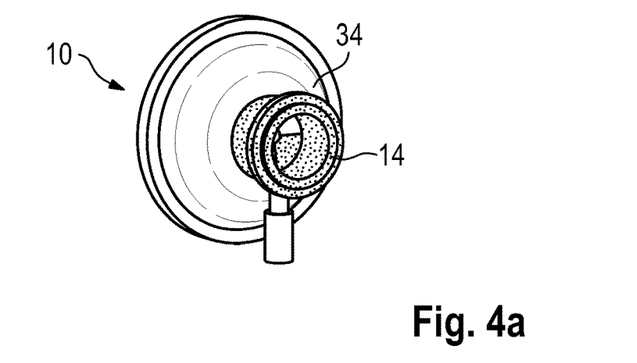
FIG. 4a schematically shows a fourth embodiment of a flow reducer for a filtration device according to the invention in a second operating position in a perspective view.
Figure 4B:
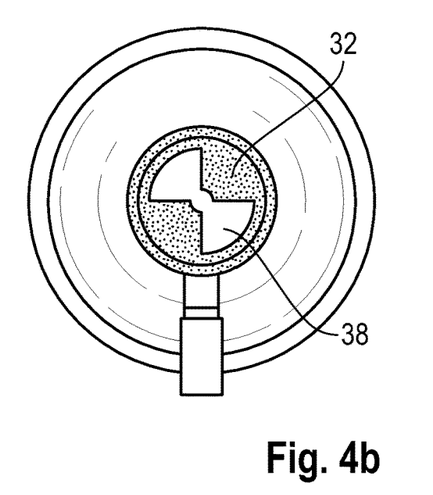
FIG. 4b schematically shows the flow reducer from FIG. 4a in a first operating position, viewed in the flow direction.
Figure 4C:
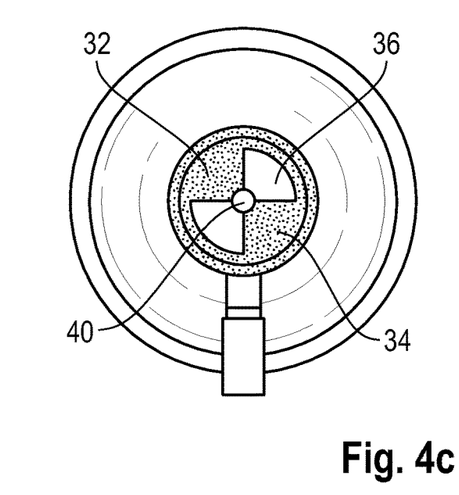
FIG. 4c schematically shows the flow reducer from FIG. 4a in the second operating position, viewed in the flow direction.
Figure 4D:
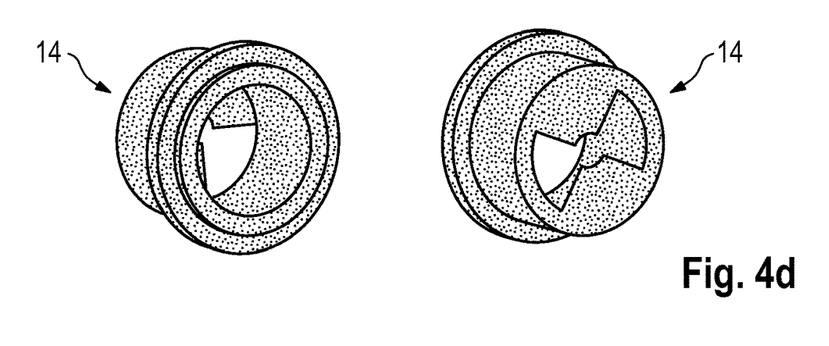
FIG. 4d schematically shows the control element of the flow reducer from FIG. 4a in perspective front and rear views.

The control element 14 can be rotated (e.g. through 90°) from the first position shown in FIG. 4b, in which the orifice plate sections 32, 36 of the control element 14 and of the cover 34 are superimposed to the greatest possible extent (filtration operation of the filter means), to the second position shown in FIG. 4c, in which the orifice plate sections 32 of the control element 14 cover the free intermediate spaces 38 between the orifice plate sections 36 of the cover 34 to the greatest possible extent (flushing operation), and vice versa. In the second position, a defined small free flow passage 40—in the illustrated exemplary embodiment a central flow passage 40—remains at all events to maintain a reduced volume flow rate.

This embodiment can be manufactured with comparatively few components.

Figure 5A:
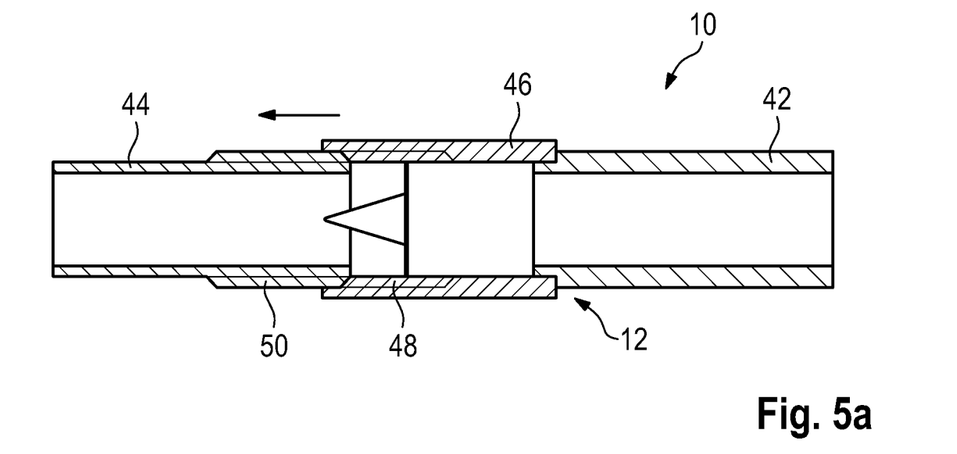
FIG. 5a schematically shows a fifth embodiment of a flow reducer for a filtration device according to the invention in a first operating position in a partly transparent side view.
Figure 5B:
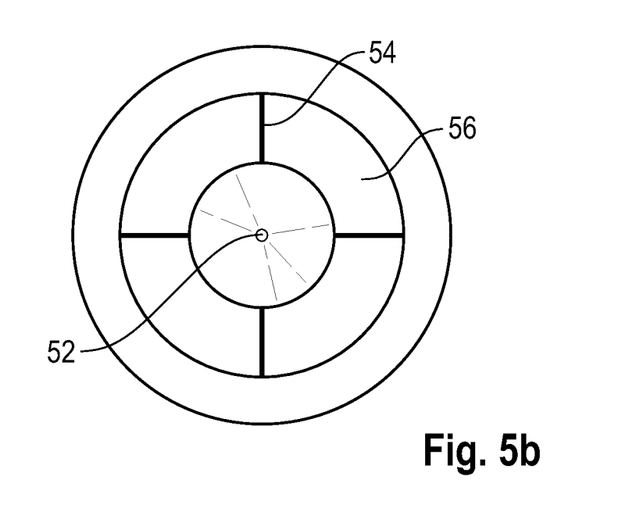
FIG. 5b schematically shows the flow reducer from FIG. 5a in the first operating position, viewed in the flow direction.

FIGS. 5a and 5b show a fifth embodiment of the flow reducer 10.

Here, the pipe section 12 of the flow reducer 10 is subdivided into two partial sections 42, 44 located opposite each other on the front sides. The first partial section 42 is firmly connected to an axially projecting sleeve 46. The projecting part of the sleeve 46 is provided with an internal thread 48, which engages an external thread 50 of the second partial section 44. By rotating the sleeve 46, this allows one partial section 42 to be moved in the axial direction towards or away from the other partial section 44, depending on the direction of rotation. The sleeve 46 provides a sterile barrier to the inside of the sleeve by sealing the thread flight. This ensures that the transition between the two partial sections 42, 44 is sealed, regardless of the axial position of the sleeve 46, and that there is no risk of contamination.

As can be seen in particular from FIG. 5b, the sleeve 46 has a control element 14 in the form of a cone (needle) arranged therein, the tip 52 of which points towards the second partial section 44 of the pipe section 12. The control element 14 is held here by a four-point retaining device with struts 54, which leaves intermediate spaces 56 open when viewed in the flow direction.

In a first position of the control element 14, it does not protrude at all or only to a comparatively small degree into the free mouth of the second partial section 44. The medium can flow largely unobstructed from the first partial section 42 into the sleeve 46 and there through the intermediate spaces 56 into the second partial section 44. This position corresponds to the intended filtration operation of the filter means.

For the flushing operation, the control element 14 is shifted towards the second partial section 44 (to the left in FIG. 5a) by a defined amount by rotating the sleeve 46. The control element 14, which now dips far into the mouth of the second partial section 44, minimizes the effective flow cross-section such that a desired back pressure is built up.

Figure 6A:
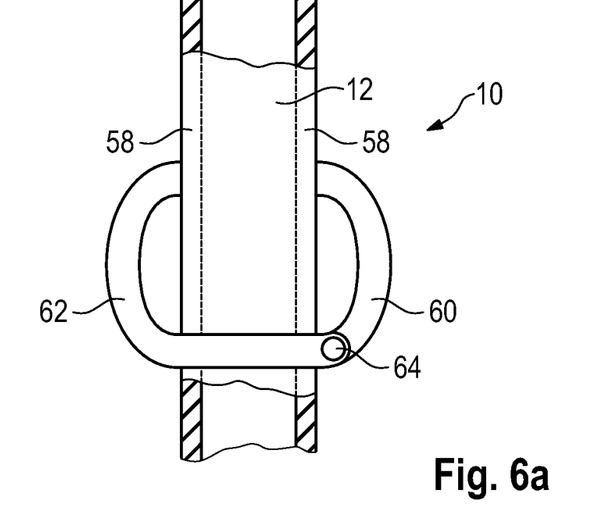
FIG. 6a schematically shows a sixth embodiment of a flow reducer for a filtration device according to the invention in a first operating position in a partly sectional side view.
Figure 6B:
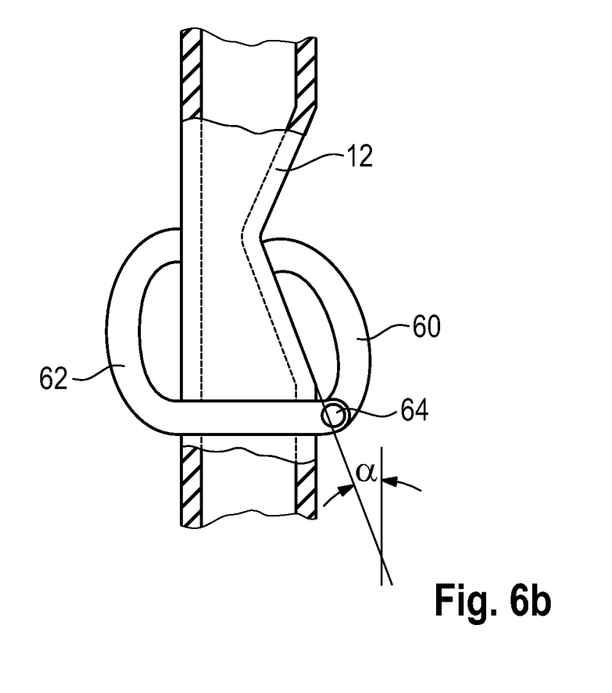
FIG. 6b schematically shows the flow reducer from FIG. 6a in a second operating position.

FIGS. 6a and 6b illustrate a sixth embodiment of the flow reducer 10. The pipe section 12 of the flow reducer 10 is formed as a flexible hose here. A control element 14 in the form of a hose clamp engages the outer wall 58 of the hose on two opposite sides. The hose clamp has two clamp sections 60, 62, which are connected to each other by means of a joint 64. The hose clamp can be angled in a defined manner by means of a catch mechanism in the joint 64.

In the first position shown in FIG. 6a (filtration operation of the filter means), the flow cross-section of the pipe section 12 is virtually unimpaired. In the second position shown in FIG. 6b (flushing operation), one of the clamp sections 60 is swiveled towards the other clamp section 62 by a specific clamping angle α. The clamping achieved in this way reduces the effective flow cross-section of the pipe section 12 at the clamping point, thereby inducing the desired reduction in flow.

Figure 7:
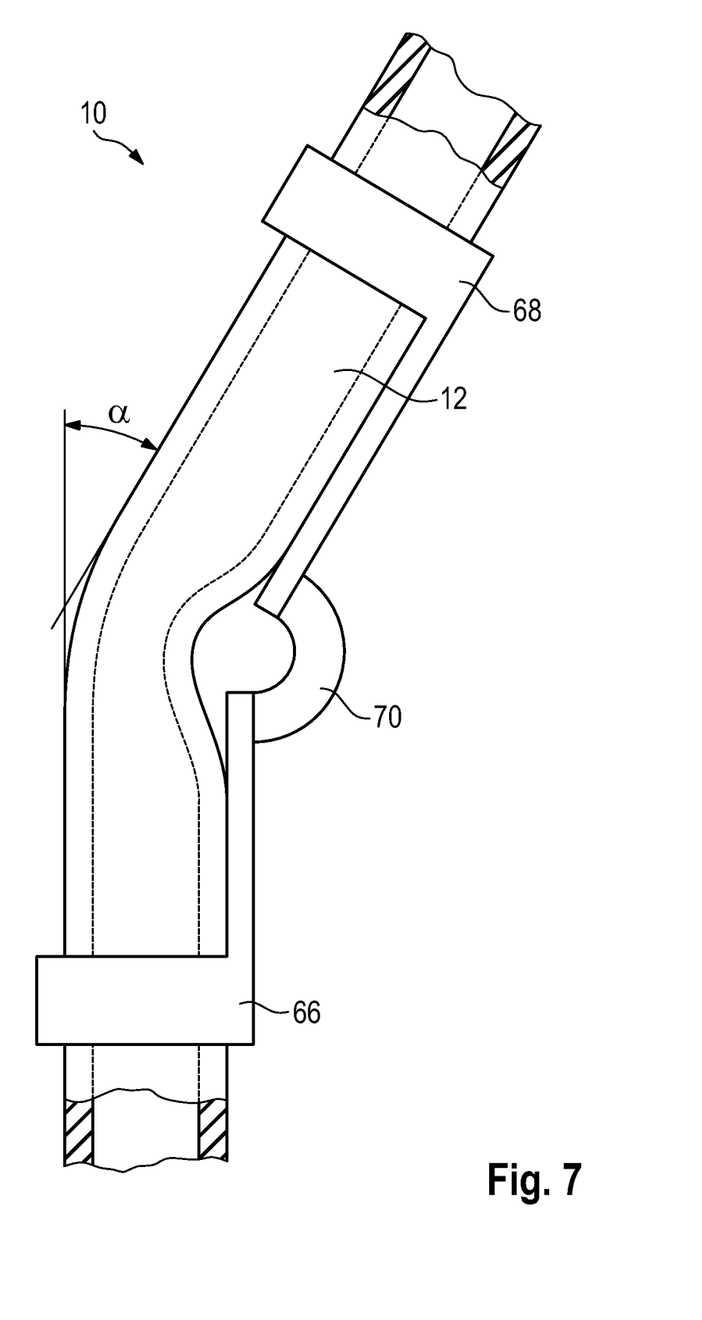
FIG. 7 schematically shows a seventh embodiment of a flow reducer for a filtration device according to the invention in a second operating position in a partly sectional side view.

FIG. 7 shows a seventh embodiment of the flow reducer 10. Similar to the sixth embodiment described above, the pipe section 12 of the flow reducer 10 is in the form of a flexible hose. The desired defined change in the effective flow cross-section to permit a normal filtration operation of the filter means with a large volume flow rate and a flushing operation with a distinctly reduced volume flow rate is effected here by means of a control element 14 in the form of a bendable articulated rail.

The articulated rail is constructed in the nature of a knee orthosis having two substantially rigid collar sections 66, 68 and an articulated joint 70 positioned therebetween. The two collar sections 66, 68 each surround a partial section of the pipe section 12. With the aid of the articulated joint 70, the flexible pipe section 12 can be bent or folded by a specific angle α, as a result of which the effective flow cross-section is reduced by a certain degree. The two folding positions and any further positions that may be provided, in particular intermediate positions, are preferably configured as detent positions.

Figure 8A:
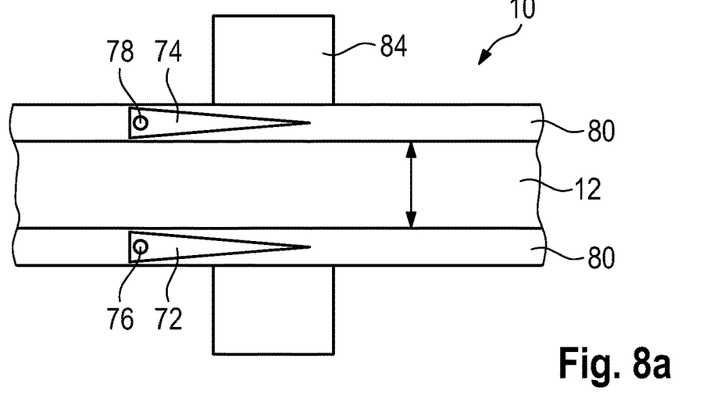
FIG. 8a schematically shows an eighth embodiment of a flow reducer for a filtration device according to the invention in a first operating position in a side view.
Figure 8B:
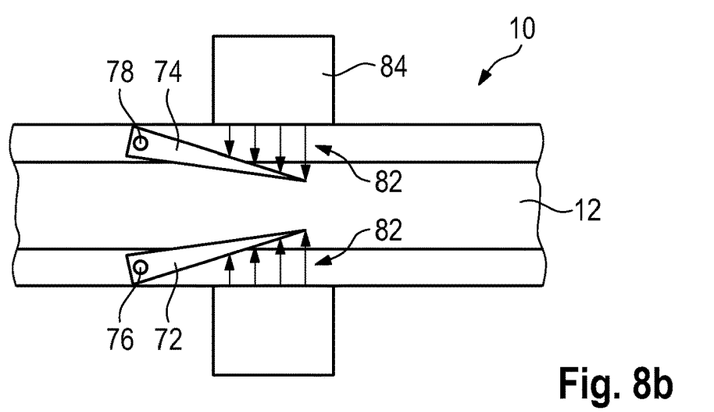
FIG. 8b schematically shows the flow reducer from FIG. 8a in a second operating position.

In the eighth embodiment shown in FIGS. 8a and 8b, a control element 14 in the form of movable flaps 72, 74 is provided in the pipe section 12 of the flow reducer 10, the flaps being fitted to the wall 80 of the pipe section 12 by means of joints 76, 78. The effective flow cross-section can be influenced by a deflection of the flaps 72, 74. The flaps 72, 74 are adapted to be deflected by a force field 82 which penetrates the wall 80 of the pipe section 12. The force field 82 is produced, for example, by electromagnetic interaction with the aid of a force field generator 84 arranged outside the pipe section 12.

A force field 82 of sufficient strength is generated to achieve a defined narrowing of the effective flow cross-section starting from the first operating position of the flow reducer 10 as shown in FIG. 8a. The flaps 72, 74 are deflected by a predetermined amount. The deflection can be limited by flap stops, for example. The narrowing results in a flow resistance increased by a defined amount, which corresponds to the second operating position of the flow reducer 10.

No additional seals etc. are required for this embodiment, since the movable components of the control element 14 are arranged within the pipe section 12 and the application of force is not mechanical, but contactless.

Figure 9:
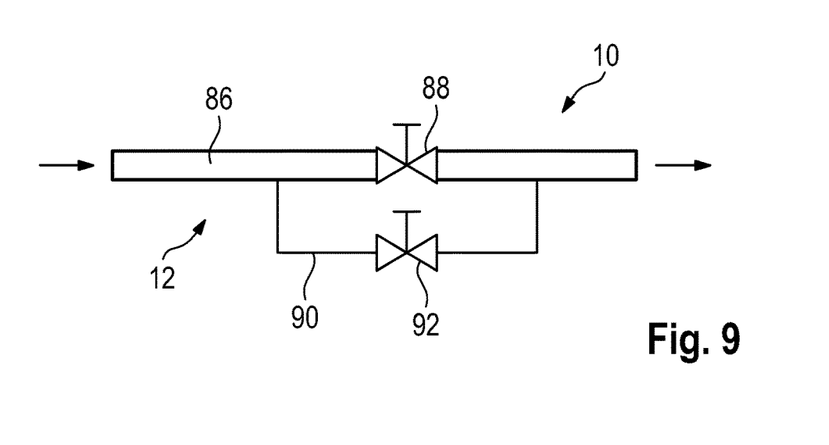
FIG. 9 schematically shows a ninth embodiment of a flow reducer for a filtration device according to the invention in a side view.

A ninth embodiment of the flow reducer 10 is shown in FIG. 9. The pipe section 12 of the flow reducer 10 here comprises a main pipe section 86 having a control element 14 in the form of a first valve 88 and a bypass pipe section 90 for bypassing the first valve 88. The bypass pipe section 90 has a flow cross-section that is significantly smaller compared with that of the main pipe section 86 and optionally includes a second valve 92.

According to a first variant of this embodiment, the first valve 88 in the main pipe section 86 is used as a pure shut-off valve. During normal filtration operation of the filter means, the first valve 88 is fully open, and during flushing operation it is fully closed. In this case, the medium can only flow through the bypass pipe section 90, which results in a reduced flow through the flow reducer 10, accompanied by a corresponding increase in pressure (back pressure). The degree of flow reduction is defined by the flow cross-section and the length of the bypass pipe section 90. Optionally, the resulting flow can be varied by the second valve 92 in the bypass pipe section 90.

In a second variant of the ninth embodiment, the flow through the main pipe section 86 can be varied by means of the first valve 88. This means that the first valve 88 can assume one or more intermediate positions so that the resulting flow through the flow reducer 10 and the pressure can be adjusted over a selectable range. The different valve positions are configured as detent positions in order to allow reproducible settings. The second valve 92, which is possibly provided, may also be designed such that it can assume one or more intermediate positions, which are preferably configured as defined detent positions. This provides even more adjustment options.

The above-described embodiments of a flow reducer 10 for a filtration device are exemplary and should therefore not be understood as being limiting. For example, certain features of the various embodiments can be combined with each other.

LIST OF REFERENCE NUMBERS

10 flow reducer
12 pipe section
14 control element
16 orifice plate
18 passage opening
20 actuating element
22 protective covering
24 body
26 passage
28 socket
30 passage ducts
32 orifice plate sections
34 cover
36 orifice plate sections
38 intermediate spaces
40 flow passage
42 first partial section
44 second partial section
46 sleeve
48 internal thread
50 external thread
52 tip
54 struts
56 intermediate spaces
58 outer wall
60 first clamp section
62 second clamp section
64 joint
66 first collar section
68 second collar section
70 articulated joint
72 first flap
74 second flap
76 first joint
78 second joint
80 wall
82 force field
84 force field generator
86 main pipe section
88 first valve
90 bypass pipe section
92 second valve

The invention claimed is:

1. A filtration device, comprising
a flow path in which a filter element and a flow reducer are arranged one behind the other, the flow reducer being adapted to be brought to a first operating position, which permits a defined first volume flow rate, and at least to a second operating position, which permits a defined second volume flow rate which is smaller than the first volume flow rate, wherein a ratio between the second volume flow rate and the first volume flow rate is between 0.05 and 0.9,
the flow reducer comprising an adjustable control element, which in the first operating position of the flow reducer assumes a defined first position, in which it exposes a first effective flow cross-section, and in the second operating position of the flow reducer assumes a defined second position, in which it exposes a second effective flow cross section, which is smaller than the first effective flow cross-section, wherein the control element is adapted to be moved to the defined positions by means of a rotating mechanism, wherein the control element comprises a cylindrical body movable in a pipe section of the flow reducer and having a cylindrical passage extending through the body that is oriented in a flow direction in the first position of the control element and substantially transversely to the flow direction in the second position of the control element.

2. The filtration device according to claim 1, characterized in that the filtration device is a disposable filtration device.

3. The filtration device according to claim 1, characterized in that the flow reducer is integrated in the filtration device.

4. The filtration device according to claim 1, characterized in that the flow reducer consists entirely of materials that are sterilizable.

5. The filtration device according to claim 1, characterized in that the ratio between the second volume flow rate and the first volume flow rate is between 0.05 and 0.5.

6. The filtration device according to claim 1, characterized by a control device by means of which the control element can be moved to the first position and to the second position in an automated manner.

7. The filtration device according to claim 1, characterized in that the control element can assume further defined positions in addition to the first and second positions.

8. The filtration device according to claim 1, characterized in that the defined positions of the control element are configured as detent positions.

9. The filtration device according to claim 8, characterized in that the control element is adapted to be transferred to the detent positions by means of a pretensioned actuating element.

10. The filtration device according to claim 9, characterized by a protective covering which surrounds the rotating mechanism and, if required, the pretensioned actuating element.

11. The filtration device according to claim 1, characterized in that the body and the passage of the control element in the second position provide sickle-shaped passage ducts.

12. The filtration device according to claim 1, characterized in that the pipe section of the flow reducer comprises a main pipe section having a first valve as the control element and a bypass pipe section for bypassing the first valve, the flow cross-section of the bypass pipe section being smaller than the flow cross-section of the main pipe section.

13. The filtration device according to claim 12, characterized in that a second valve is provided in the bypass pipe section.

14. The filtration device according to claim 13, characterized in that the first valve and/or the second valve is/are adapted to assume a plurality of positions in which different flow cross-sections are exposed.

15. A method of completely wetting a filter membrane in the filtration device according to claim 1 within a scope of a flushing process, characterized in that the flow reducer is in the second operating position, which permits a defined second volume flow rate, which is smaller than the first volume flow rate, so that the flushing of the filter element is effected with a reduced volume in order to completely wet the filter membrane, wherein the flow reducer is brought to the first operating position after the flushing process for carrying out a filtration process.

16. The method according to claim 15, characterized in that the complete wetting of the filter membrane is performed while saving flushing medium by 10 to 95% in comparison with the complete wetting without pressure reduction.

* * * * *